Nov. 8, 1960 C. ØLLGAARD JENSEN 2,959,329
TRACTOR DRIVEN MACHINE FOR THE DISTRIBUTION OF A MIXTURE
OF CHOPPED STABLE MANURE AND MANURE SLUDGE
Filed July 29, 1957 2 Sheets-Sheet 1
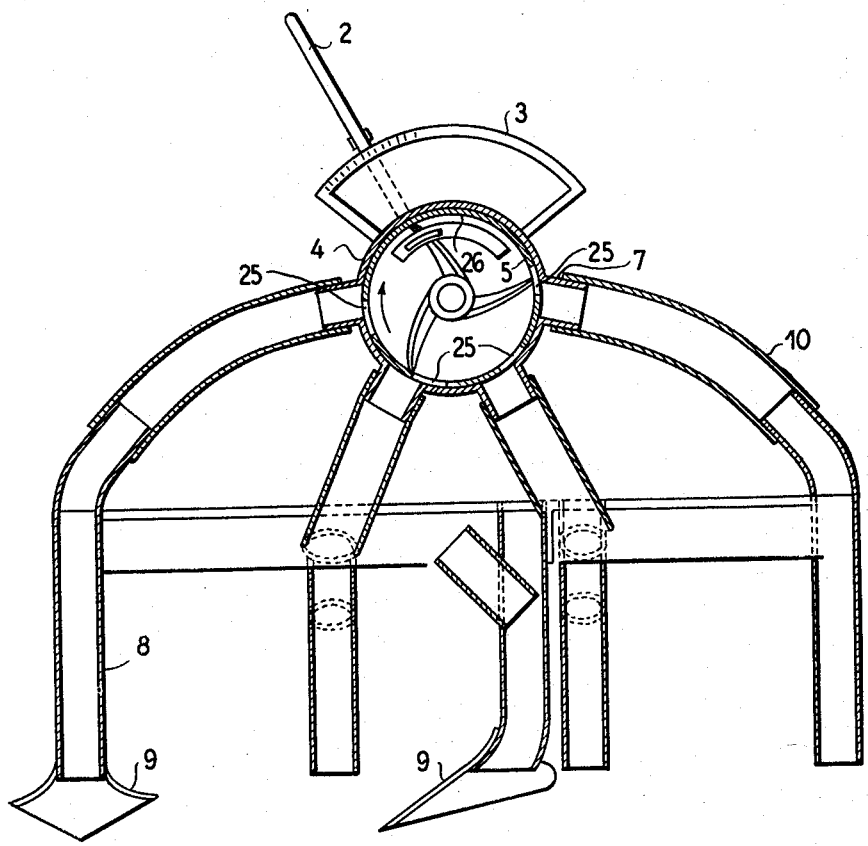
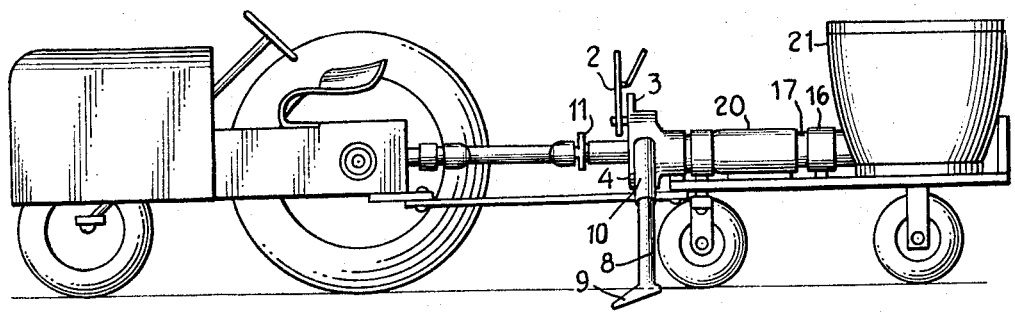

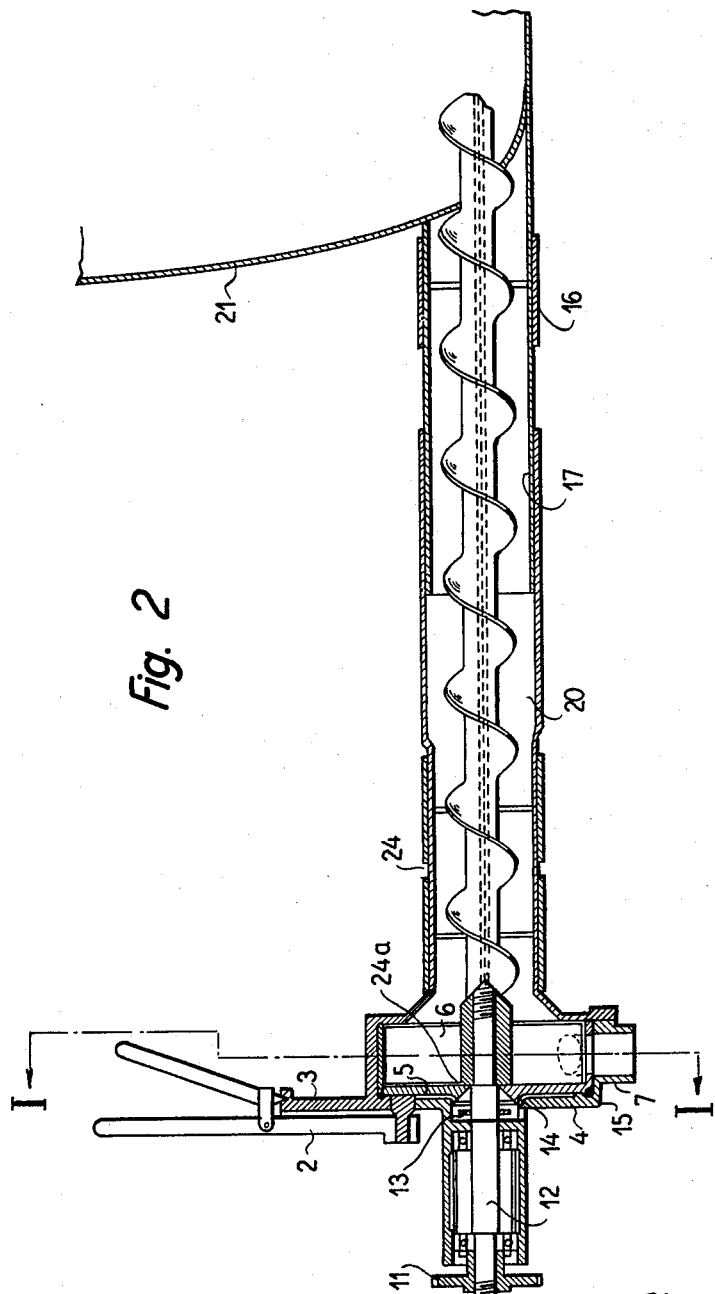

United States Patent Office 2,959,329
Patented Nov. 8, 1960

2,959,329

TRACTOR DRIVEN MACHINE FOR THE DISTRIBUTION OF A MIXTURE OF CHOPPED STABLE MANURE AND MANURE SLUDGE

Christian Øllgaard Jensen, Solvang, 31 Bredgade, Lem Station, Denmark

Filed July 29, 1957, Ser. No. 674,744

1 Claim. (Cl. 222—178)

This invention relates to new and useful improvements in tractor driven machines for the distribution of a mixture of chopped stable manure and manure sludge.

It is well known to have machines for the chopping of stable manure and a simultaneous mixing of the chopped stable manure with manure sludge kept in a tank under or adjacent to the stable. When such machines are used the resultant mixture is again conducted down into the tank where it is kept until it is to be taken out into the field. It is possible to transport and spread it by means of an ordinary distributor for liquid manure, but due to the fact that the mixture is considerably more viscid than ordinary liquid manure, clogging of the distributing tubes will often take place.

The present invention relates to a tractor driven machine for the distribution of a mixture of chopped stable manure and manure sludge comprising a manure container arranged on a tractor drawn vehicle as well as a pump driven by a power take-off shaft of the tractor and with the suction pipes of the pump connected to the manure container and furthermore the pressure side of the pump is connected to a set of distributing tubes.

In the known machines of this type the pressure side of the pump is connected to a branched pipe for the distribution of the gruelly manure to various distributing tubes. Clogging in the branched pipe will, however, often arise, where the flow changes direction or in the regulation cocks inserted in the distributing tubes. Thus the object of this invention is to build the pump the branched pipe and the regulation cocks together in such a manner that the risk of clogging is reduced essentially.

This object is obtained, according to the invention, in the manner that the pump consists of a fanned wheel rotatable in a cylindrical housing the cylindrical walls of which are provided with nozzles connected to the distributing tubes, and furthermore there is in the interior of the housing mounted a cylindrical regulation ring closely fitting to the inner wall of the housing and tightly enclosing the fanned wheel, said regulation ring being provided with perforations arranged with the same angular distance as the openings of the nozzles. The said regulation ring is preferably rigidly connected to a radially set regulation handle which can be moved along a circularly shaped scale. By this construction it is possible by turning the regulation ring to close and open the openings of the nozzles more or less, in which manner the amount of manure flowing through the distributing tubes can be regulated rather finely. At the same time it is obtained by this construction that the individual distributing tubes receive exactly the same amount of manure per time unit. Preferably all the perforations are of so small a peripheric extent that the openings of all the nozzles are closed by a certain position of the regulation ring and handle. The said wing wheel which pumps the mixture by throwing it out against the periphery of the housing, has furthermore the important function to scrape the perforations of the regulation ring free of dirt so that neither in this place clogging can occur. Preferably the wing wheel turns the same way around as the regulation ring during its opening movement. In this manner it is obtained that the manure mixture is deflected as little as possible when the nozzles are partly closed, i.e. when the perforations are not located exactly opposite the openings of the nozzles. This reduces the risk of straw collecting and consequently clogging at the places where the flow is deflected. The wing wheel passes closely past perforations of the regulation ring and cleans exactly at the side of the perforations where there is danger of dirt collecting. If the wing wheel rotated in the opposite direction dirt might deposit in the corner between the regulation ring and the pump housing.

In the drawing is shown a manner of construction of a machine according to the invention, in which, Figure 1 is a cross section of the machine along the line 1—1 in Figure 2, and Figure 2 is a longitudinal section of the machine.

Figure 3 is an elevational view showing a tractor driven machine.

From the bottom of a manure container 21 mounted on a vehicle a suction pipe 20 is extending and opening centrally in a cylindrical pump housing 4 in which a wing wheel 6 is centrally rotatably located. The wing wheel is mounted on a shaft 12 journalled in ball bearings outside the pump housing and driven from the power take-off shaft of the tractor.

The cylindrical wall of the pump housing has four radially set nozzles 7 which by means of rubber hoses 10 are connected to the same number of distributing tubes 8, each provided with a coulter at the lowermost end. The distributing tubes 8 are arranged on a frame.

In the pump house 4 is inserted a cylindrical regulation ring 5 fitting closely to the inner wall of the housing and enclosing tightly the wing wheel 6, said regulation ring 5 having perforations 25 which in size correspond to the openings of the nozzles 7. The regulation ring 5 is turned by means of a handle 2 rigidly mounted on said ring and co-operating with a circularly shaped scale 3 indicating the amount of manure. Along the periphery the regulation ring is made tight fitting relative to the pump housing by means of a rubber string 15 and is in the interior made tight fitting relative to the shaft 12 by means of a rotating self-tightening packing 24a. Leaking manure, if any, will flow along the shaft 12 until it reaches a rubber ring 13 which is fastened on the same, and which will fling away the manure whereafter the same will drip out through a hole 14 in the bearing housing.

During the working of the machine the shaft 12 with the wing wheel 6 is operated in such a manner that the manure mixture is sucked from the container 21 through the suction pipe 20 and into the pump housing 4 from where the manure is flung out towards the periphery by the fans on the wing wheel 6. The mixture is then pressed in larger or smaller quantities through the nozzles 7 and the hoses 10 to the distributing tubes 8, depending on the position of the regulating ring 5, i.e. the position of the handle 2. When the handle 2 in Figure 1 is turned completely to the right hand side the regulation ring 5 will close the nozzles 7 so that in this position of the handle of the pump will be in its neutral position.

What I claim as my invention, and desire to secure by Letters Patent of the United States is:

A tractor driven machine for the distribution of a mixture of chopped stable manure and manure sludge comprising a fertilizer container mounted on a tractor drawn carriage, a pump driven from a power take-off shaft, a suction pipe of said pump being connected to said fertilizer container, a set of distributing tubes having the pressure side of said pump connected thereto, the shaft of the pump being arranged horizontally and between the pump and the fertilizer container, a conveyor worm extending into the fertilizer container along the bottom of the latter, a cylindrical regulation ring of said pump fitting tightly against the wall of the housing of the pump, said ring and the distributing tubes having openings at the same angular distance, a wing wheel of the pump fitting tightly against the regulation ring and the inner surface of the pump housing, and the distribution pipes projecting radially and downwardly outward from said pump housing.

References Cited in the file of this patent

UNITED STATES PATENTS

| | | |
|---|---|---|
| 2,601,608 | Hansen | June 24, 1952 |
| 2,783,921 | Stokland | Mar. 5, 1957 |